United States Patent
Takita et al.

(12)

(10) Patent No.: US 9,321,946 B2
(45) Date of Patent: Apr. 26, 2016

(54) PRIMER COMPOSITION

(75) Inventors: Yuka Takita, Ichikawa (JP); Kyouko Miyauchi, Ichikawa (JP); Hidetoshi Yamabe, Ichikawa (JP)

(73) Assignee: SUMITOMO METAL MINING CO., LTD., Tokyo (JP)

(*) Notice: Subject to any disclaimer, the term of this patent is extended or adjusted under 35 U.S.C. 154(b) by 0 days.

(21) Appl. No.: 13/822,119

(22) PCT Filed: Sep. 9, 2011

(86) PCT No.: PCT/JP2011/070626
§ 371 (c)(1),
(2), (4) Date: May 17, 2013

(87) PCT Pub. No.: WO2012/036091
PCT Pub. Date: Mar. 22, 2012

(65) Prior Publication Data
US 2013/0225726 A1 Aug. 29, 2013

(30) Foreign Application Priority Data

Sep. 13, 2010 (JP) ................................. 2010-204089
Mar. 4, 2011 (JP) ................................. 2011-047170

(51) Int. Cl.
| C09D 163/00 | (2006.01) |
| C09D 163/04 | (2006.01) |
| C09D 5/00 | (2006.01) |
| C09J 163/04 | (2006.01) |
| C09D 5/08 | (2006.01) |
| C08G 59/38 | (2006.01) |
| C08G 59/40 | (2006.01) |

(52) U.S. Cl.
CPC ............... *C09J 163/04* (2013.01); *C08G 59/38* (2013.01); *C08G 59/4021* (2013.01); *C09D 5/002* (2013.01); *C09D 5/084* (2013.01); *C09D 163/00* (2013.01); *C09D 163/04* (2013.01)

(58) Field of Classification Search
CPC .... C09J 163/00; C09J 163/04; C09D 163/00; C09D 163/04; C09D 5/002
USPC ....................................................... 523/429
See application file for complete search history.

(56) References Cited

U.S. PATENT DOCUMENTS

| 4,169,187 | A | * | 9/1979 | Glazar .......................... 428/418 |
| 4,900,848 | A | * | 2/1990 | Saito et al. .................... 549/517 |
| 8,088,846 | B2 | * | 1/2012 | Hsieh et al. ..................... 524/87 |
| 2002/0111439 | A1 | * | 8/2002 | Attarwala et al. ............ 525/426 |
| 2004/0075802 | A1 | * | 4/2004 | Kitamura et al. ............. 349/153 |
| 2004/0176563 | A1 | * | 9/2004 | Shinohara et al. .............. 528/87 |
| 2007/0123653 | A1 | * | 5/2007 | Attarwala et al. ............ 525/167 |
| 2008/0200084 | A1 | * | 8/2008 | Angus et al. .................... 442/59 |
| 2010/0140803 | A1 | * | 6/2010 | Sakamoto et al. ............ 257/762 |
| 2010/0285309 | A1 | * | 11/2010 | Barriau et al. ................ 428/336 |
| 2011/0255141 | A1 | * | 10/2011 | Agrawal et al. ............... 359/267 |

FOREIGN PATENT DOCUMENTS

| JP | 56-100823 A | 8/1981 |
| JP | 61-019623 A | 1/1986 |
| JP | 06-009311 A | 1/1994 |
| JP | 10-025462 A | 1/1998 |
| JP | 2007-077358 A | 3/2007 |
| JP | 2009-220328 A | 10/2009 |

OTHER PUBLICATIONS

Machine translation of JP 2009-220328, 2014.*
H Yamabe et al., "A Study of Surface Modification of Stainless Steels", Journal of the Japan Society of Colour Material, vol. 70, No. 12, 1997, pp. 763-771, a cover page and table of contents.
H.-J. Tiller et al., "Silicoater-Verfahren", Fertigungssystem Kleben', 89, VCH Verlag, 1989, pp. 95-105 and cover pages.
International Search Report dated Dec. 6, 2011, issued for PCT/JP2011/070626.

* cited by examiner

*Primary Examiner* — Liam J Heincer
(74) *Attorney, Agent, or Firm* — Locke Lord LLP; James E. Armstrong, IV; Nicholas J. DiCeglie, Jr.

(57) ABSTRACT

Disclosed herein is a primer composition for metal materials, capable of forming a primer layer excellent in adhesion properties and film-forming properties on the surfaces of various metal materials such as common steel, stainless steel, aluminum, aluminum alloy, copper, and zinc plating to impart high bond strength and high bond durability when the metal materials are bonded with an epoxy-based adhesive. The primer composition is intended to be applied onto the surface of a metal material to be bonded with an epoxy-based adhesive and includes an epoxy resin containing both a bifunctional epoxy resin containing at least a bisphenol A-type epoxy resin and a multifunctional epoxy resin containing at least a phenol novolac-type epoxy resin, a curing agent composed of cyandiamide, a curing catalyst composed of imidazole, and an inorganic oxide filler composed of silica and titanium oxide.

12 Claims, No Drawings

PRIMER COMPOSITION

TECHNICAL FIELD

The present invention relates to a novel primer composition capable of improving the affinity of surfaces of various metal materials for an adhesive so as to tightly bond the metal materials with the adhesive.

BACKGROUND ART

Various metal materials such as common steel, stainless steel, aluminum, aluminum alloy, copper, and galvanized steel are widely used in many fields, such as building materials and electronic devices, for their excellence in corrosion resistance and external appearance. When these metal materials are used as structural members, various components and so on, it is often the case that metal material plates need to be joined together or with other components or members. In this case, metal material plates are conventionally often joined by welding.

However, when metal material plates are joined by welding, there is a problem that weld marks are left on the surfaces of the welded metal material plates, which impairs excellent external appearance unique to metal material plates. Further, sheet-metal processing is required to remove weld marks or weld distortions. Such sheet-metal processing is unpopular among workers as well as peripheral neighboring residents because a lot of time and effort are required and working environment is worsened by noise generation etc.

For this reason, as a method for joining metal materials as an alternative to welding, a bonding method using an adhesive has received attention in recent years. The bonding method using an adhesive is advantageous in that the external appearance of metal materials is hardly impaired and therefore the above-described sheet-metal processing is not required. However, the surface of a metal material is generally often coated with a stable oxide layer. Particularly, stainless steel is coated with an oxide layer excellent in corrosion resistance but very low in affinity for an adhesive. Because of this, metal materials have a problem that they are poor in adhesion. The bonding method using an adhesive is thus disadvantageous in that an adhesive interface is poor in water resistance, and therefore when an adhesive joint between metal materials is exposed to a high-temperature and high-humidity environment, bond strength is significantly reduced in a short period of time.

The affinity of a metal material for an adhesive, especially for an epoxy-based adhesive can be improved by previously subjecting the surface of the metal material to activation treatment using an acid. For example, a method is known in which the surface of a stainless steel plate is treated with a mixed aqueous solution of sulfuric acid and oxalic acid. Further, a method is known in which an aluminum plate or an aluminum alloy plate is immersed in a phosphoric acid aqueous solution or a dichromic acid aqueous solution, or alternatively, an aluminum plate or an aluminum alloy plate is electrically anodized while being immersed in such an aqueous solution. These treatment methods are known to develop excellent adhesiveness, and are therefore practically used in, for example, an assembly process of an airplane.

However, the above-described method for activating the surface of a stainless steel plate by acid treatment has a problem that smut is generated on the surface of the stainless steel plate. This smut can be removed by treating the surface of the stainless steel plate with a mixed aqueous solution of dichromic acid and sulfuric acid. However, such desmutting treatment generates chromium-containing wastewater and is therefore strictly limited from the viewpoint of environmental destruction.

As a bonding method not requiring such desmutting treatment, a method has recently been tried, in which a primer is previously applied onto the surface of a stainless steel plate to form an organic thin film (primer layer) to improve adhesiveness. For example, Patent Literature 1 discloses a method to enhance the adhesiveness of the stainless steel plate. According to this method, the surface of a stainless steel plate is treated with an aqueous primer containing an acidic phosphoric acid ester and/or a salt thereof and water. Patent Literature 2 discloses a method in which the surface of a common steel plate or a stainless steel plate is treated with a silane-based coupling agent to improve its adhesiveness to a fluorine-based coating film.

It has been confirmed that the affinity of common steel plates, stainless steel plates, aluminum plates, and aluminum alloy plates for an epoxy-based adhesive is improved by such surface treatment using an acidic phosphoric acid ester or a silane-based coupling agent. However, such surface treatment methods cannot achieve adhesiveness comparable to that achieved by the above-described conventional treatment method using a mixed aqueous solution of sulfuric acid and oxalic acid. Therefore, it cannot be said that a bonded structure obtained by bonding a stainless steel plate or the like has bond strength and durability high enough for practical use, and therefore the bonded structure cannot be stably used for a long period of time.

Further, Patent Literature 3 discloses a primer composition containing a multifunctional epoxy resin and a bisphenol A-type epoxy resin as main components and imidazole as a curing agent. However, the primer composition is poor in film-forming properties due to the absence of a filler. Further, the primer composition is diluted with an organic solvent such as toluene or methyl ethyl ketone to secure coating workability, and therefore it is necessary to take measures against air pollution caused by VOCs (Volatile Organic Compounds), which is disadvantageous in that many restrictions are imposed during production and use.

Using a silane coupling agent is known as a technique for imparting adhesiveness to common steel plates, stainless steel plates, aluminum plates, aluminum alloy plates, etc. For example, Non-Patent Literature 1 describes that the adhesiveness of stainless steel plates, aluminum plates, aluminum alloy plates, etc. is improved by treatment using a silane coupling agent having a functional group reactive with an epoxy-based adhesive. However, the silane coupling agent has a monomer structure, and therefore it is difficult to uniformly apply its diluted solution onto a soiled metal surface in practice.

That is, the silane coupling agent can be tightly attached to an unsoiled metal surface by the condensation reaction of, for example, an alkoxy group or its hydrolysate, i.e., a silanol group and a hydroxyl group in an oxide layer on the metal surface. However, a metal surface is usually contaminated with organic or inorganic matter present in the atmosphere, and the organic or inorganic matter deposited on an oxide layer on the metal surface is already tightly attached. It is actually difficult to completely remove such a contamination layer. Therefore, at present, it is difficult to uniformly attach the silane coupling agent to a soiled metal surface in practice.

Further, with the spread of the bonding method, there are more and more cases where adhesive joints are exposed to a severe usage environment such as a high-temperature and high-humidity environment. For example, in the case of immersion in boiling water, i.e., exposure to the severest conditions, it is difficult for surface treatment using a silane coupling agent or the like to suppress a reduction in the adhesiveness of adhesive joints. It is to be noted that Non-Patent Literature 2 proposes silicoater treatment as treatment for imparting stable adhesiveness to adhesive joints of various metal materials even in boiling water. However, the silicoater treatment is high-temperature flame treatment, and therefore its application is limited to small base materials.

CITATION LIST

Patent Literatures

Patent Literature 1: Japanese Patent Application Laid-Open (JP-A) No. 06-009311
Patent Literature 2: Japanese Patent Application Publication (JP-B) No. 06-057872
Patent Literature 3: JP-A No. 2007-077358
Non-Patent Literatures
Non-Patent Literature 1: H Yamabe et al., "A Study of Surface Modification of Stainless Steels", Journal of the Japan Society of Colour Material, Vol. 70, No. 12, 1997, p. 763-771
Non-Patent Literature 2: Tiller et al., "Silicoater-Verfahren", Fertigungssystem Kleben', 89, VCH Verlag, 1989, p. 95-106

SUMMARY OF INVENTION

Technical Problem

In view of the above-described conventional problems, it is an object of the present invention to provide an environmentally-friendly primer composition for various metal materials capable of forming a primer layer excellent in adhesion properties and film-forming properties on the surfaces of various metal materials to be bonded with an epoxy-based adhesive, imparting bond strength and bond durability equal or superior to those imparted by treatment using a mixed aqueous solution of acids or chemical treatment using a silane coupling agent, which is conventional treatment practically used for bonding of various metal materials, and achieving excellent coating workability without using a solvent.

Solution to Problem

In order to achieve the above object, there is provided a primer composition for metal materials to be applied onto a surface of a metal material to be bonded with an epoxy-based adhesive in accordance with the present invention. The primer composition includes: an epoxy resin containing both a bifunctional epoxy resin containing at least a bisphenol A-type epoxy resin and a multifunctional epoxy resin containing at least a phenol novolac-type epoxy resin; a curing agent composed of cyandiamide; a curing catalyst composed of imidazole; and an inorganic oxide filler composed of silica and titanium oxide, wherein a solvent is not contained.

In the primer composition for metal materials according to the present invention, it is preferable that the bifunctional epoxy resin is a bisphenol A-type epoxy resin alone or a mixture of a bisphenol A-type epoxy resin and a bisphenol F-type epoxy resin, and the multifunctional epoxy resin is a phenol novolac-type epoxy resin alone or a mixture of a phenol novolac-type epoxy resin and a p-aminophenol-type epoxy resin.

It is preferable that the epoxy resin containing both the bifunctional epoxy resin and the multifunctional epoxy resin is obtained by blending the bifunctional epoxy resin and the multifunctional epoxy resin such that a weight ratio of multifunctional epoxy resin:bifunctional epoxy resin is in a range of 10:90 to 30:70. Further, it is preferable that an amount of the curing agent to be blended is in a range of 3 to 25 parts by weight with respect to 100 parts by weight of total amount of the epoxy resins, and an amount of the curing catalyst to be blended is in a range of 0.5 to 2 parts by weight with respect to 100 parts by weight of a total amount of the epoxy resins.

In the primer composition for metal materials according to the present invention, it is preferable that the silica and the titanium oxide contained in the inorganic oxide filler both have an average particle size of 2 to 30 μm and are blended such that a ratio by parts by weight of silica:titanium oxide is in a range of 70:10 to 40:40 with respect to 100 parts by weight of a total amount of the epoxy resins. Further, it is preferable that the imidazole as the curing catalyst is 2-methylimidazole.

Advantageous Effects of Invention

According to the present invention, it is possible to form a primer layer excellent in adhesion properties and film-forming properties on the surfaces of various metal materials to enhance the affinity of the various metal materials for an epoxy-based adhesive. This makes it possible to, when a metal material with the primer layer is bonded with an epoxy-based adhesive, achieve high bond strength equal to or higher than that achieved by treatment using a mixed aqueous solution of acids or chemical treatment using a silane coupling agent.

Further, an obtained adhesive joint is excellent in water resistance at high temperatures, and therefore can maintain high bond strength for a long period of time even when exposed to a high-temperature and high-humidity environment, e.g., immersion in boiling water. Further, the primer composition according to the present invention is an environmentally-friendly material because a low viscosity can be achieved without using a solvent, and therefore environmental loads caused by coating work are low and there is no fear of air pollution caused by VOCs.

Therefore, the use of the primer composition for metal materials according to the present invention makes it possible to obtain building materials and other structural members excellent in strength by simply bonding metal materials with an adhesive. When the primer composition for metal materials according to the present invention is used for bonding of an electric insulating material, an adhesive joint can maintain stable adhesiveness even under severe use conditions, e.g., immersion in a high-temperature and strongly acidic or strongly alkaline aqueous solution, which brings a new dimension to various electrochemical processes. As described above, the primer composition according to the present invention is excellent in adhesion stability and can form a coating film having a very high crosslink density, and is therefore very useful also as an insulating film for, metals for use in a strongly acidic or strongly basic aqueous solution.

DESCRIPTION OF EMBODIMENT

A primer composition for metal materials according to the present invention includes, as essential components, an epoxy resin, a curing agent, a curing catalyst, and an inorganic oxide filler, and is applied onto the surface of a member made of a metal material, such as a metal plate or the like, to form a primer layer to improve the affinity of the metal material for an epoxy-based adhesive. Therefore, various metal materials such as common steel, stainless steel, aluminum, aluminum alloy, copper, and galvanized steel can be easily and tightly bonded with an epoxy-based adhesive by forming thereon a primer layer of the primer composition for metal materials according to the present invention.

A metal material to which the primer composition according to the present invention is applied is not limited by its type or form, and the primer composition according to the present invention can be appropriately applied to plates, members of other forms, metal components, and the like which are made of various metal materials such as common steel, stainless steel, aluminum, aluminum alloy, copper, and galvanized steel. In the case of steel plates, the primer composition according to the present invention can be applied to, for example, common steel plates such as cold rolling steel plates and hot rolling steel plates and various stainless steel plates such as martensitic stainless steel plates, ferritic stainless steel plates, and austenitic stainless steel plates.

An epoxy-based adhesive to be used to bond various metal materials having a primer layer formed thereon from the primer composition according to the present invention may be of one-component type or two-component type. Among them, a two-component type epoxy-based adhesive is preferred because high bond strength can be achieved in industrial applications.

The primer composition according to the present invention mainly contains an epoxy resin. As the epoxy resin, a bifunctional epoxy resin and a multifunctional epoxy resin are used in combination. More specifically, a bifunctional epoxy resin containing a bisphenol-type epoxy resin is blended with a multifunctional epoxy resin containing at least a phenol novolac-type epoxy resin. This makes it possible to increase the crosslink density of a cured product, thereby improving heat resistance and mechanical strength. Particularly, it is important for the cured product to have a high crosslink density under severe use conditions, e.g., immersion in boiling water.

In the primer composition according to the present invention, the bisphenol-type epoxy resin constituting the bifunctional epoxy resin contains at least a bisphenol A-type epoxy resin. For example, the bifunctional epoxy resin may be a bisphenol A-type epoxy resin alone or a mixture of a bisphenol A-type epoxy resin and a bisphenol F-type epoxy resin. In the case of a mixture of a bisphenol A-type epoxy resin and a bisphenol F-type epoxy resin, the bisphenol A-type epoxy resin and the bisphenol F-type epoxy resin are preferably blended such that a weight ratio of bisphenol A-type epoxy resin:bisphenol F-type epoxy resin is in a range of 20:60 to 60:20.

Both the bisphenol A-type epoxy resin and the bisphenol F-type epoxy resin, which are bifunctional bisphenol-type epoxy resins, have strong adhesiveness to a metal surface due to the hydrogen bond properties of their hydroxyl group with the metal surface or flexibility given by intramolecular ether bond rotation. However, the bisphenol F-type epoxy resin has a lower viscosity while having metal adhesiveness equivalent to the bisphenol A-type epoxy resin, and therefore a desired viscosity can be achieved by blending both the bisphenol-type epoxy resins.

On the other hand, the phenol novolac-type epoxy resin constituting the multifunctional epoxy resin may be a mixture of two or more phenol novolac-type epoxy resins adjusted to a desired viscosity to achieve a coating viscosity within a practically applicable range. Further, a p-aminophenol-type epoxy resin, which is also a multifunctional epoxy resin like the phenol novolac-type epoxy resin, may be blended with the phenol novolac-type epoxy resin to achieve a lower viscosity.

In such a case where a p-aminophenol-type epoxy resin is blended with the phenol novolac-type epoxy resin, the amount of the p-aminophenol-type epoxy resin to be blended is preferably one-half or less of the amount of the phenol novolac-type epoxy resin.

The bifunctional epoxy resin and the multifunctional epoxy resin are preferably blended such that a weight ratio of multifunctional epoxy resin:bifunctional epoxy resin is in a range of 10:90 to 30:70. The reason for this is that if the amount of the multifunctional epoxy resin to be blended is less than 10 parts by weight with respect to 100 parts by weight of the total amount of the epoxy resins, it is difficult to secure the boiling water resistant adhesiveness of a primer. On the other hand, if the amount of the multifunctional epoxy resin to be blended exceeds 30 parts by weight, the degree of cross-linking is increased so that a primer becomes fragile, and in addition, it is difficult to achieve adequate adhesiveness due to the generation of a large stress between the primer and a metal material.

As a curing agent for the epoxy resin, cyandiamide is used. Cyandiamide is solid at normal temperature and hardly reacts with the epoxy resin. However, cyandiamide is liquefied at a temperature higher than its melting point and reacts with a glycidyl group of the epoxy resin to cross-link and cure the epoxy resin. The primer composition for metal materials according to the present invention uses cyandiamide having such properties as a curing agent, and is provided as a one component-type primer composition excellent in storage stability at normal temperature by previously blending cyandiamide with the epoxy resin.

The amount of the cyandiamide to be blended as a curing agent is preferably in the range of 3 to 25 parts by weight with respect to 100 parts by weight of the total amount of the epoxy resins. If the amount of the cyandiamide to be blended is less than 3 parts by weight, curing of the primer composition is insufficient and therefore it is difficult to achieve satisfactory boiling water resistant adhesiveness. On the other hand, if the amount of the cyandiamide to be blended exceeds 25 parts by weight, the curing agent is excessive and therefore the primer composition undesirably becomes rigid and fragile.

The primer composition for metal materials according to the present invention uses imidazole as a curing catalyst. The selection of a curing catalyst is important because it influences the curing performance of the cyandiamide used as a curing agent and the properties of a cured product. Imidazole is often used as a curing agent for a common epoxy resin, but in the present invention, imidazole is used as a curing catalyst in combination with the cyandiamide used as a curing agent. This makes it possible to reduce the curing temperature of the epoxy resin to a manageable temperature of 180° C. or less and to obtain the effect of improving the heat resistance of a cured coating. Particularly, the glass transition temperature of the cured coating needs to be 100° C. or higher to allow an adhesive joint to maintain high boiling water resistant adhesiveness. For this purpose, the combined use of the cyandiamide as a curing agent and the imidazole as a curing catalyst is important.

The amount of the imidazole to be blended as a curing catalyst is preferably in the range of 0.5 to 2.0 parts by weight with respect to 100 parts by weight of the total amount of the epoxy resins. If the amount of the imidazole to be blended is less than 0.5 part by weight, a phenomenon in which curing does not occur is likely to occur, and on the other hand, if the amount of the imidazole to be blended exceeds 2.0 parts by weight, curing proceeds during storage of the primer composition, which undesirably tends to cause gelation.

Preferred examples of the imidazole usable as a curing catalyst include 2-methylimidazole, 2-undecylimidazole, 2-heptadecylimidazole, 1,2-dimethylimidazole, 2-ethyl-4-methylimidazole, 2-phenylimidazole, 1-cyanoethyl-2-methylimidazole, 1-cyanoethyl-2-undecylimiazole, 1-cyanoethyl-2-phenylimidazole, 1-cyanoethyl-2-undecylimidazolium trimellitate, 2,4-diamino-6-(2'-methylimidazolyl-(1'))-ethyl-s-triazine, and 2,4-diamino-6-(2'-undecylimidazolyl-(1'))-ethyl-s-triazine. Among them, 2-methylimidazole is particularly preferred.

Further, the primer composition for metal materials according to the present invention contains an inorganic oxide filler to obtain excellent coating properties and film-forming properties on a metal material surface and to secure excellent adhesiveness of a cured coating to a metal material surface in a severe environment. Particularly, if viscosity is reduced by heating during baking/curing, there is a fear that, when a metal material surface is soiled, a primer coating is repelled and loses its continuity. However, such a reduction in viscosity in a high-temperature atmosphere can be appropriately suppressed by blending an inorganic oxide filler, which makes it possible to maintain the continuity of a primer coating. It is to be noted that the primer composition for metal materials according to the present invention may further contain calcium carbonate as an extender.

In the present invention, silica and titanium oxide are used in combination as such an inorganic oxide filler. Both the silica and the titanium oxide preferably have an average particle size of 2 to 30 μm. Further, the titanium oxide to be used desirably has a high affinity for the epoxy resin. If the affinity of the titanium oxide for the epoxy resin is low, water is likely to enter the interface between the titanium oxide and the epoxy resin, which degrades adhesiveness in a water resistance test, such as immersion in boiling water, because water easily reaches a metal material surface due to channeling along the silica in a cured coating. For this reason, as the titanium oxide excellent in affinity for the epoxy resin, alumina- or silica-coated titanium oxide or organic coated titanium oxide is preferred.

As the amount of the titanium oxide to be blended with the silica included in the inorganic oxide filler is increased, film-forming properties are improved due to suppression of a reduction in viscosity during heating, but at the same time, coating workability is reduced due to an increase in viscosity. Therefore, the titanium oxide and the silica constituting the inorganic oxide filler are preferably blended such that a ratio by parts by weight of silica:titanium oxide is in a range of 70:10 to 40:40 with respect to 100 parts by weight of the total amount of the epoxy resins.

It is to be noted that as a well-known primer composition, one mainly containing a bisphenol A-type epoxy resin and a multifunctional epoxy resin is described in the above-mentioned Patent Literature 3. The coating workability of this primer composition is secured by solvent dilution. Therefore, for example, when toluene is used as a solvent, handling is complicated because it is necessary to take measures against air pollution. On the other hand, the viscosity of the primer composition for metal materials according to the present invention can be controlled to be suitable for coating work using a bar coater or the like by blending only the above-described components without using a solvent such as toluene. More specifically, the viscosity of the primer composition according to the present invention can be controlled to about 4 to 30 Pa·s.

EXAMPLES

Example 1

A bisphenol A-type epoxy resin (epoxy resin A1), a bisphenol F-type epoxy resin (epoxy resin A2), phenol novolac epoxy resins (epoxy resin B and epoxy resin C), and a p-aminophenol-type epoxy resin (epoxy resin D) were blended as epoxy resins in various ratios, and a curing agent, a curing catalyst, and an inorganic oxide filler (silica and titanium oxide) were further blended to prepare primer compositions of Samples 1 to 19. The compositions of Samples 1 to 19 are shown in the following Table 1.

It is to be noted that JER828 manufactured by Mitsubishi Chemicals, Inc. was used as the epoxy resin A1, JER806 manufactured by Mitsubishi Chemicals, Inc. was used as the epoxy resin A2, JER152 manufactured by Mitsubishi Chemicals, Inc. was used as the epoxy resin B, JER154 manufactured by Mitsubishi Chemicals, Inc. was used as the epoxy resin C, and JER630 manufactured by Mitsubishi Chemicals, Inc. was used as the epoxy resin D.

A cyandiamide curing agent (DICY7) manufactured by Mitsubishi Chemicals, Inc: was used as the curing agent, and 2-methylimidazole manufactured by Shikoku Chemicals Corporation was used as the curing catalyst. Silica (HS-05 manufactured by KINSEI MATEC Co., Ltd.) having an average particle size of 3 to 24 μm and titanium oxide (TIPAQUE CR60 manufactured by Ishihara Sangyo Kaisha, Ltd.) having an average particle size of 0.21 μm were used as the inorganic oxide filler.

TABLE 1

| | Epoxy resins (parts by weight) | | | | | Others (parts by weight/100 parts by weight of epoxy resins) | | | | |
|---|---|---|---|---|---|---|---|---|---|---|
| Samples | A1 | A2 | B | C | D | Curing agent | Curing catalyst | Silica | Titanium oxide | Visc. |
| 1 | 70 | 0 | 15 | 15 | 0 | 5 | 1 | 50 | 30 | 14.5 |
| 2 | 80 | 0 | 10 | 10 | 0 | 5 | 1 | 50 | 30 | 10.1 |
| 3 | 90 | 0 | 5 | 5 | 0 | 5 | 1 | 50 | 30 | 9.7 |
| 4 | 70 | 0 | 7.5 | 7.5 | 15 | 5 | 1 | 50 | 30 | 9 |
| 5 | 80 | 0 | 5 | 5 | 10 | 5 | 1 | 50 | 30 | 8.7 |
| 6 | 90 | 0 | 2.5 | 2.5 | 5 | 5 | 1 | 50 | 30 | 8.4 |
| 7 | 55 | 25 | 5 | 5 | 10 | 5 | 1 | 50 | 30 | 5.8 |
| 8 | 40 | 40 | 5 | 5 | 10 | 5 | 1 | 50 | 30 | 4.9 |
| 9 | 25 | 55 | 5 | 5 | 10 | 5 | 1 | 50 | 30 | 4 |
| 10 | 80 | 0 | 10 | 10 | 0 | 4 | 1 | 50 | 30 | 10.1 |
| 11 | 80 | 0 | 10 | 10 | 0 | 20 | 1 | 50 | 30 | 12.8 |

TABLE 1-continued

| | Epoxy resins | | | | | Others (parts by weight/100 parts by weight of epoxy resins) | | | | |
|---|---|---|---|---|---|---|---|---|---|---|
| | (parts by weight) | | | | | | Curing | | Titanium | |
| Samples | A1 | A2 | B | C | D | Curing agent | catalyst | Silica | oxide | Visc. |
| 12 | 80 | 0 | 10 | 10 | 0 | 5 | 0.5 | 50 | 30 | 10 |
| 13 | 80 | 0 | 10 | 10 | 0 | 5 | 2.0 | 50 | 30 | 10.2 |
| 14 | 80 | 0 | 10 | 10 | 0 | 5 | 1 | 60 | 20 | 9.8 |
| 15 | 80 | 0 | 10 | 10 | 0 | 5 | 1 | 40 | 40 | 15.6 |
| *16 | 100 | 0 | 0 | 0 | 0 | 5 | 1 | 50 | 30 | 7.2 |
| *17 | 80 | 0 | 10 | 10 | 0 | 5 | 0 | 50 | 30 | 8.1 |
| *18 | 80 | 0 | 10 | 10 | 0 | 5 | 1 | 0 | 30 | 6.1 |
| *19 | 80 | 0 | 10 | 10 | 0 | 5 | 1 | 50 | 0 | 5.2 |

(Note)
Samples marked with an asterisk (*) in the table are comparative examples.

More specifically, each of the primer compositions of Samples 1 to 19 was prepared by mixing its components, which are weighed in amounts shown in the above Table 1, in an Excel Auto Homogenizer manufactured by NISSEI Corporation for 2 minutes at a rotation speed of 10000 rpm. The viscosity of each of the obtained primer compositions of Samples 1 to 19 was measured using a BV-type viscometer (40° C., 5 rpm), and as a result, was within the range of 4 to 17 Pa·s as shown in the above Table 1.

Then, the primer compositions of Samples 1 to 19 shown in the above Table 1 were applied onto the surfaces of test pieces cut out from a stainless steel plate to form primer layers to prepare Samples 1-a to 19-a. The thus obtained stainless steel plates with primer layer of Samples 1-a to 19-a were evaluated for film-forming properties during coating. In addition, the same two stainless steel plates with primer layer of each of Samples 1-a to 19-a were bonded together with a two component-type epoxy-based adhesive to evaluate bond performance.

More specifically, a plurality of test pieces with a width of 25 mm and a length of 100 mm were cut out from a 1.2 mm-thick SUS304 stainless steel plate (2B finish), and these test pieces were immersed in acetone at room temperature for 3 minutes for degreasing. Then, the primer compositions of Samples 1 to 19 were applied onto the surfaces of the test pieces by a bar coater to have a thickness of 60 μm and cured by heating at 175° C. for 45 minutes to form primer layers to obtain Samples 1-a to 19-a. The primer layer of each of Samples 1-a to 19-a was visually observed to evaluate film-forming properties.

Then, bond performance was evaluated in the following manner. The same two test pieces with primer layer of each of Samples 1-a to 19-a were prepared and opposed to each other so that their primer layers were on the inside, and were immediately bonded together with a two component-type epoxy-based adhesive (DP-190 GRAY manufactured by Sumitomo 3M Limited) so that a lap width was 12.5 mm. An adhesive joint was cured at room temperature for 24 hours, and was further maintained at 100° C. for 1 hour to be completely cured. The thus bonded test pieces of each of Samples 1-a to 19-a were subjected to measurement of initial shear bond strength according to JIS K 6850. Further, in order to examine the water resistance of the adhesive joint, the bonded test pieces of each of Samples 1-a to 19-a were immersed in boiling water for 7 days and then subjected to measurement of shear bond strength in the same manner as described above.

The measurement results of initial shear bond strength and shear bond strength after immersion in boiling water are shown in the following Table 2 together with the evaluation results of film-forming properties of the primer compositions. For the purpose of comparison, two stainless steel plate test pieces with no primer layer (Sample 20-a) were bonded together with the above-described two component-type epoxy-based adhesive and subjected to measurement of shear bond strength in the same manner as described above, and the measurement results are also shown in the following Table 2. It is to be noted that, in the following Table 2, the film-forming properties were evaluated according to the following criteria: 'good' denotes a case where a film of the primer composition was uniformly formed on the entire surface of the test piece; 'average' denotes a case where a film of the primer composition was formed but one-half or more of the surface of the test piece was not coated with the film; and 'poor' denotes a case where a film of the primer composition was not formed at all.

TABLE 2

| Samples | Film-forming properties | Initial shear bond strength (MPa) | Shear bond strength after immersion in boiling water (MPa) |
|---|---|---|---|
| 1-a | good | 20 | 15 |
| 2-a | good | 22 | 17 |
| 3-a | good | 23 | 15 |
| 4-a | good | 25 | 14 |
| 5-a | good | 26 | 15 |
| 6-a | good | 28 | 14 |
| 7-a | good | 21 | 14 |
| 8-a | good | 24 | 15 |
| 9-a | good | 22 | 14 |
| 10-a | good | 20 | 14 |
| 11-a | good | 18 | 14 |
| 12-a | good | 19 | 13 |
| 13-a | good | 21 | 16 |
| 14-a | good | 21 | 15 |
| 15-a | good | 23 | 18 |
| *16-a | average | 22 | 12 |
| *17-a | good | 13 | 7 |
| *18-a | average | 15 | 10 |
| *19-a | poor | Not measurable | Not measurable |
| *20-a | With no primer layer | 20 | 2 |

(Note)
Samples marked with an asterisk (*) in the table are comparative examples.

As is clear from the above results, the primer compositions of Samples 1 to 15 according to the present invention had excellent film-forming properties on the stainless steel plate, and the stainless steel plates with primer layer of each of Samples 1-a to 15-a bonded together with the epoxy-based adhesive had high bond strength and further had excellent water resistance and therefore could maintain high bond strength.

On the other hand, Samples 16-a to 19-a (comparative examples) using the primer compositions of Samples 16 to 19 were poor in either of film-forming properties or bond strength. Particularly, in the case of Sample 19-a using the primer composition of Sample 19, bonding of the stainless steel plates could not even be performed. It is to be noted that when a primer layer was not provided, as can be seen from the results of Sample 20-a with no primer layer, bonding of the stainless steel plates could be performed, but water resistance was poor and therefore the shear bond strength was rapidly reduced by immersion in boiling water.

Example 2

The primer compositions of Samples 1 to 19 shown in the above Table 1 were applied onto the surfaces of test pieces cut out from a common steel plate in the same manner as in Example 1 to form primer layers to obtain Samples 1-b to 19-b. It is to be noted that the common steel plate used was a 1.2 mm-thick cold rolling steel plate and the test pieces cut out from the steel plate had the same width (i.e., 25 mm) and length (i.e., 100 mm) as the test pieces used in Example 1.

The obtained common steel plates with primer layer of Samples 1-b to 19-b were evaluated for film-forming properties during coating and bond performance in bonding with a two component-type epoxy-based adhesive in the same manner as in Example 1. The obtained results are shown in the following Table 3 together with the results of Sample 20-b with no primer layer.

TABLE 3

| Samples | Film-forming properties | Initial shear bond strength (MPa) | Shear bond strength after immersion in boiling water (MPa) |
|---|---|---|---|
| 1-b | good | 22 | 18 |
| 2-b | good | 24 | 18 |
| 3-b | good | 25 | 18 |
| 4-b | good | 28 | 16 |
| 5-b | good | 27 | 17 |
| 6-b | good | 30 | 16 |
| 7-b | good | 23 | 16 |
| 8-b | good | 25 | 17 |
| 9-b | good | 24 | 16 |
| 10-b | good | 22 | 16 |
| 11-b | good | 20 | 17 |
| 12-b | good | 21 | 15 |
| 13-b | good | 24 | 18 |
| 14-b | good | 23 | 17 |
| 15-b | good | 25 | 20 |
| *16-b | average | 23 | 9 |
| *17-b | good | 16 | 9 |
| *18-b | average | 17 | 11 |
| *19-b | poor | Not measurable | Not measurable |
| *20-b | With no primer layer | 21 | 4 |

(Note)
Samples marked with an asterisk (*) in the table are comparative examples.

As can be seen from the above results, the primer compositions of Samples 1 to 15 according to the present invention had excellent film-forming properties on the common steel plate, and the common steel plates with primer layer of each of Samples 1-b to 15-b bonded together with the epoxy-based adhesive had high bond strength and further had excellent water resistance and therefore could maintain high bond strength.

On the other hand, Samples 16-b to 19-b (comparative examples) using the primer compositions of Samples 16 to 19 were poor in either of film-forming properties or bond strength. Particularly, in the case of Sample 19-b, bonding of the common steel plates could not even be performed. It is to be noted that in the case of Sample 20-b with no primer layer, bonding of the common steel plates could be performed, but water resistance was poor and therefore the shear bond strength was rapidly reduced by immersion in boiling water.

Example 3

The primer compositions of Samples 1 to 19 shown in the above Table 1 were applied onto the surfaces of test pieces cut out from an aluminum alloy plate in the same manner as in Example 1 to form primer layers to obtain Samples 1-c to 19-c. It is to be noted that the aluminum alloy plate was a 1.6 mm-thick A2024-T3 aluminum alloy plate and the test pieces had the same width (i.e., 25 mm) and length (i.e., 100 mm) as those used in Example 1.

The obtained aluminum alloy plates with primer layer of Samples 1-c to 19-c were evaluated for film-forming properties during coating and bond performance in bonding with a two component-type epoxy-based adhesive in the same manner as in Example 1. The obtained results are shown in the following Table 4 together with the results of Sample 20-c with no primer layer.

TABLE 4

| Samples | Film-forming properties | Initial shear bond strength (MPa) | Shear bond strength after immersion in boiling water (MPa) |
|---|---|---|---|
| 1-c | good | 14 | 12 |
| 2-c | good | 15 | 13 |
| 3-c | good | 16 | 14 |
| 4-c | good | 18 | 16 |
| 5-c | good | 17 | 15 |
| 6-c | good | 17 | 14 |
| 7-c | good | 16 | 13 |
| 8-c | good | 16 | 12 |
| 9-c | good | 17 | 11 |
| 10-c | good | 16 | 13 |
| 11-c | good | 14 | 12 |
| 12-c | good | 13 | 11 |
| 13-c | good | 14 | 11 |
| 14-c | good | 15 | 12 |
| 15-c | good | 15 | 13 |
| *16-c | average | 14 | 9 |
| *17-c | good | 12 | 6 |
| *18-c | average | 14 | 9 |
| *19-c | poor | Not measurable | Not measurable |
| *20-c | With no primer layer | 15 | 5 |

(Note)
Samples marked with an asterisk (*) in the table are comparative examples.

As can be seen from the above results, the primer compositions of Samples 1 to 15 according to the present invention had excellent film-forming properties on the aluminum alloy plate, and the aluminum alloy plates with primer layer of each of Samples 1-c to 15-c bonded together with the epoxy-based adhesive had high bond strength and excellent water resistance.

On the other hand, Samples 16-c to 19-c (comparative examples) using the primer compositions of Samples 16 to 19 were poor in either of film-forming properties or bond strength. Particularly, in the case of Sample 19-c using the primer composition of Sample 19, bonding of the aluminum alloy plates could not even be performed. It is to be noted that in the case of Sample 20-c with no primer layer, bonding of the aluminum alloy plates could be performed, but water resistance was poor and therefore the shear bond strength was rapidly reduced by immersion in boiling water.

Example 4

The primer compositions of Samples 1 to 19 shown in the above Table 1 were applied onto the surfaces of test pieces cut out from a copper plate in the same manner as in Example 1 to form primer layers to obtain Samples 1-d to 19-d. It is to be noted that the copper plate was a 1.2 mm-thick copper plate, and the test pieces had the same width (i.e., 25 mm) and length (i.e., 100 mm) as those used in Example 1.

The obtained copper plates with primer layer of Samples 1-d to 19-d were evaluated for film-forming properties during coating and bond performance in bonding with a two component-type epoxy-based adhesive in the same manner as in Example 1. The obtained results are shown in the following Table 5 together with the results of Sample 20-d with no primer layer.

TABLE 5

| Samples | Film-forming properties | Initial shear bond strength (MPa) | Shear bond strength after immersion in boiling water (MPa) |
| --- | --- | --- | --- |
| 1-d | good | 18 | 14 |
| 2-d | good | 20 | 15 |
| 3-d | good | 21 | 13 |
| 4-d | good | 23 | 11 |
| 5-d | good | 24 | 13 |
| 6-d | good | 26 | 12 |
| 7-d | good | 19 | 12 |
| 8-d | good | 22 | 13 |
| 9-d | good | 20 | 12 |
| 10-d | good | 18 | 12 |
| 11-d | good | 16 | 12 |
| 12-d | good | 17 | 11 |
| 13-d | good | 19 | 14 |
| 14-d | good | 19 | 13 |
| 15-d | good | 21 | 16 |
| *16-d | average | 20 | 10 |
| *17-d | good | 11 | 5 |
| *18-d | average | 13 | 8 |
| *19-d | poor | Not measurable | Not measurable |
| *20-d | With no primer layer | 18 | 3 |

(Note)
Samples marked with an asterisk (*) in the table are comparative examples.

As can be seen from the above results, the primer compositions of Samples 1 to 15 according to the present invention had excellent film-forming properties on the copper plate, and the copper plates with primer layer of each of Samples 1-d to 15-d bonded together with the epoxy-based adhesive had high bond strength and excellent water resistance.

On the other hand, Samples 16-d to 19-d (comparative examples) using the primer compositions of Samples 16 to 19 were poor in either of film-forming properties or bond strength. Particularly, in the case of Sample 19-d using the primer composition of Sample 19, bonding of the copper plates could not even be performed. It is to be noted that in the case of Sample 20-d with no primer layer, bonding of the copper plates could be performed, but water resistance was poor and therefore the shear bond strength was rapidly reduced by immersion in boiling water.

Example 5

The primer compositions of Samples 1 to 19 shown in the above Table 1 were applied onto the surfaces of test pieces cut out from a galvanized steel plate in the same manner as in Example 1 to form primer layers to obtain Samples 1-e to 19-e. It is to be noted that the galvanized steel plate was a 1.2 mm-thick alloyed hot-dip galvanized steel plate and the test pieces had the same width (i.e., 25 mm) and length (i.e., 100 mm) as those used in Example 1.

The obtained galvanized steel plates with primer layer of Samples 1-e to 19-e were evaluated for film-forming properties during coating and bond performance in bonding with a two component-type epoxy-based adhesive in the same manner as in Example 1. The obtained results are shown in the following Table 6 together with the results of Sample 20-e with no primer layer.

TABLE 6

| Samples | Film-forming properties | Initial shear bond strength (MPa) | Shear bond strength after immersion in boiling water (MPa) |
| --- | --- | --- | --- |
| 1-e | good | 17 | 14 |
| 2-e | good | 19 | 13 |
| 3-e | good | 20 | 12 |
| 4-e | good | 23 | 11 |
| 5-e | good | 22 | 12 |
| 6-e | good | 25 | 11 |
| 7-e | good | 18 | 12 |
| 8-e | good | 19 | 12 |
| 9-e | good | 18 | 11 |
| 10-e | good | 17 | 11 |
| 11-e | good | 15 | 12 |
| 12-e | good | 16 | 10 |
| 13-e | good | 19 | 13 |
| 14-e | good | 18 | 12 |
| 15-e | good | 20 | 15 |
| *16-e | average | 18 | 4 |
| *17-e | good | 11 | 4 |
| *18-e | average | 12 | 6 |
| *19-e | poor | Not measurable | Not measurable |
| *20-e | With no primer layer | 16 | 2 |

(Note)
Samples marked with an asterisk (*) in the table are comparative examples.

As can be seen from the above results, the primer compositions of Samples 1 to 15 according to the present invention had excellent film-forming properties on the galvanized steel plates, and the galvanized steel plates with primer layer of each of Samples 1-e to 15-e bonded together with the epoxy-based adhesive had high bond strength and excellent water resistance.

On the other hand, Samples 16-e to 19-e (comparative examples) using the primer compositions of Samples 16 to 19 were poor in either of film-forming properties or bond strength. Particularly, in the case of Sample 19-e using the primer composition of Sample 19, bonding of the galvanized steel plates could not even be performed. It is to be noted that in the case of Sample 20-e with no primer layer, bonding of the galvanized steel plates could be performed, but water resistance was poor and therefore the shear bond strength was rapidly reduced by immersion in boiling water.

The invention claimed is:

1. A primer composition for metal materials to be applied onto a surface of a metal material to be bonded with an epoxy-based adhesive, comprising:
    an epoxy resin containing both
        a bifunctional epoxy resin which is a a mixture of a bisphenol A-epoxy resin and a bisphenol F epoxy resin and
        a multifunctional epoxy resin, excluding a bifunctional epoxy resin, containing a mixture of two phenol novolac epoxy resins and a p-aminophenol epoxy resin, wherein the two phenol novolac epoxy resins each having no bifunctional epoxy resin are contained in the same parts by weight;
    a curing agent composed of cyandiamide;
    a curing catalyst composed of imidazole; and
    an inorganic oxide filler composed of silica and titanium oxide, wherein the primer composition is a one component-type composition having a viscosity of 4 to 30 Pa-s and includes no solvent.

2. The primer composition for metal materials according to claim 1, wherein the epoxy resin containing both the bifunctional epoxy resin and the multifunctional epoxy resin is obtained by blending the bifunctional epoxy resin and the multifunctional epoxy resin such that a weight ratio of multifunctional epoxy resin: bifunctional epoxy resin is in a range of 10:90 to 30:70.

3. The primer composition for metal materials according to claim 2, wherein an amount of the curing agent to be blended is in a range of 3 to 25 parts by weight with respect to 100 parts by weight of a total amount of the epoxy resins.

4. The primer composition for metal materials according to claim 3, wherein an amount of the curing catalyst to be blended is in a range of 0.5 to 2 parts by weight with respect to 100 parts by weight of a total amount of the epoxy resins.

5. The primer composition for metal materials according to previously presented claim 4, wherein the silica and the titanium oxide contained in the inorganic oxide filler both have an average particle size of 2 to 30 μm and are blended such that a ratio by parts by weight of silica: titanium oxide is in a range of 70:10 to 40:40.

6. The primer composition for metal materials according to claim 5, wherein the imidazole as the curing catalyst is 2-methylimidazole.

7. The primer composition for metal materials according to claim 1, wherein an amount of the curing agent to be blended is in a range of 3 to 25 parts by weight with respect to 100 parts by weight of a total amount of the epoxy resins.

8. The primer composition for metal materials according to claim 1, wherein an amount of the curing catalyst to be blended is in a range of 0.5 to 2 parts by weight with respect to 100 parts by weight of a total amount of the epoxy resins.

9. The primer composition for metal materials according to claim 1, wherein the silica and the titanium oxide contained in the inorganic oxide filler both have an average particle size of 2 to 30 ∞m and are blended such that a ratio by parts by weight of silica: titanium oxide is in a range of 70:10 to 40:40.

10. The primer composition for metal materials according to claim 1, wherein the imidazole as the curing catalyst is 2-methylimidazole.

11. A metal material on which the primer composition according to claim 6 is applied, wherein the metal material is any one of a common steel plate, a stainless steel plate, an aluminum plate, an aluminum alloy plate, a copper plate, and a galvanized steel plate.

12. A metal material on which the primer composition according to claim 1 is applied, wherein the metal material is any one of a common steel plate, a stainless steel plate, an aluminum plate, an aluminum alloy plate, a copper plate, and a galvanized steel plate.

* * * * *